United States Patent
Biebach et al.

(10) Patent No.: US 9,718,526 B2
(45) Date of Patent: Aug. 1, 2017

(54) BOAT WITH HIGH-VOLTAGE SYSTEM

(71) Applicant: Torqeedo GmbH, Gilching (DE)

(72) Inventors: Jens Biebach, Tutzing (DE); Philipp Krieger, Feldafing (DE); Marc Hartmeyer, Munich (DE)

(73) Assignee: Torqeedo GmbH, Gilching (DE)

( * ) Notice: Subject to any disclaimer, the term of this patent is extended or adjusted under 35 U.S.C. 154(b) by 258 days.

(21) Appl. No.: 14/442,051

(22) PCT Filed: Nov. 11, 2013

(86) PCT No.: PCT/EP2013/003390
§ 371 (c)(1),
(2) Date: May 11, 2015

(87) PCT Pub. No.: WO2014/072070
PCT Pub. Date: May 15, 2014

(65) Prior Publication Data
US 2015/0274276 A1  Oct. 1, 2015

(30) Foreign Application Priority Data

Nov. 12, 2012 (DE) .......................... 10 2012 021 993
Feb. 3, 2013 (EP) ...................................... 13000546

(51) Int. Cl.
*B63H 21/17* (2006.01)
*B63H 20/00* (2006.01)
(Continued)

(52) U.S. Cl.
CPC .......... *B63H 21/17* (2013.01); *B60R 16/0207* (2013.01); *B60R 16/03* (2013.01); *B63H 20/007* (2013.01); *B63J 2003/043* (2013.01)

(58) Field of Classification Search
CPC .. B63H 21/17; B63H 20/007; B60R 16/0207; B60R 16/03; B63J 2003/043
(Continued)

(56) References Cited

U.S. PATENT DOCUMENTS 3,898,547 A * 8/1975 Poole .................... B60L 3/00
318/139
4,028,594 A * 6/1977 Schossow ............ H02H 11/001
307/326
(Continued)

FOREIGN PATENT DOCUMENTS

CN          2556123 Y       6/2003
CN        201194079 Y       2/2009
(Continued)

OTHER PUBLICATIONS

PCT/EP2013/003390, International Search Report dated Jan. 28, 2014 (Two (2) pages).
(Continued)

*Primary Examiner* — Jared Fureman
*Assistant Examiner* — Michael Warmflash
(74) *Attorney, Agent, or Firm* — Crowell & Moring LLP

(57) ABSTRACT

The invention relates to a boat with an electric drive that comprises electric components, especially an electric motor and an electric storage unit. The components are interconnected via an electric grid. At least one of the components is connected to the grid by means of a first connection means, the first connection means comprising first connection means main contacts for connecting the at least one component to the grid, and a second connection means being provided for connecting the electric storage unit to or disconnecting it from the grid. According to the invention, the first connection means comprises at least one pair of auxiliary contacts for connecting the at least one component (Continued)

to a monitoring line and said monitoring line is operatively connected to the second connection means.

14 Claims, 4 Drawing Sheets

(51) Int. Cl.
*B60R 16/02* (2006.01)
*B60R 16/03* (2006.01)
*B63J 3/04* (2006.01)

(58) Field of Classification Search
USPC .......................................................... 307/9.1
See application file for complete search history.

(56) References Cited

U.S. PATENT DOCUMENTS

| | | | | |
|---|---|---|---|---|
| 8,337,264 B2* | 12/2012 | Boebel | ................. | B63H 20/007 |
| | | | | 440/6 |
| 2007/0155256 A1* | 7/2007 | Boebel | ................... | B63H 21/17 |
| | | | | 440/6 |
| 2011/0244739 A1* | 10/2011 | Daikoku | ............ | B60L 11/1803 |
| | | | | 440/6 |
| 2012/0181856 A1* | 7/2012 | Sheahan, Jr. | ............. | B60L 7/14 |
| | | | | 307/9.1 |

FOREIGN PATENT DOCUMENTS

| | | |
|---|---|---|
| CN | 201865778 U | 6/2011 |
| EP | 1 806 280 A1 | 7/2007 |
| WO | WO 2014/072071 A1 | 5/2014 |
| WO | WO 2014/072072 A1 | 5/2014 |
| WO | WO 2014/072073 A1 | 5/2014 |
| WO | WO 2014/072074 A1 | 5/2014 |

OTHER PUBLICATIONS

Chinese Office Action issued in Chinese counterpart application No. 201380058901.X dated Sep. 18, 2016, with English translation (Ten (10) pages).
U.S. patent application, "Electrical Accumulator with Water Sensor", U.S. Appl. No. 14/442,047, filed May 11, 2015, First named inventor: Marc Hartmeyer et al.
U.S. patent application, "Boat with Electric Drive", U.S. Appl. No. 14/442,056, filed May 11, 2015, First named inventor: Jens Biebach et al.
U.S. patent application, "Boat with Electric Drive", U.S. Appl. No. 14/442,058, filed May 11, 2015, First named inventor: Jens Biebach et al.
U.S. patent application, "Boat with Electric Drive and Emergency Off Switch", U.S. Appl. No. 14/442,062, filed May 11, 2015, First named inventor: Jens Biebach et al.

* cited by examiner

BOAT WITH HIGH-VOLTAGE SYSTEM

This application claims the priority of International Application No. PCT/EP2013/003390, filed Nov. 11, 2013, German Patent Document No. 10 2012 021 993.8, filed Nov. 12, 2012, and European Patent Document 13000546.5, filed Feb. 3, 2013, the disclosures of which are expressly incorporated by reference herein.

BACKGROUND AND SUMMARY OF THE INVENTION

The invention relates to a boat having an electrical drive, which electrical drive comprises electrical components, in particular an electric motor and an electrical accumulator, that are connected to one another via an electrical wiring system, wherein at least one of the components is connected to the wiring system by means of a first connecting device, which has main contacts for connecting the at least one component to the wiring system, and wherein a second connecting device is provided in order to connect the electrical accumulator to the wiring system or to disconnect same from the wiring system. In addition, the invention relates to a method for connecting and disconnecting an electrical component to and respectively from an electrical wiring system comprising at least one electrical accumulator and located on a boat.

In an electrical circuit, the individual electrical components together with the voltage source are connected to one another via a wiring system and combined into a complete system. It is not always guaranteed that the components are electrically isolated during installation. A particular potential hazard is posed by male connectors. If individual areas of the circuit are already connected to the voltage source, then the open connection to a component that has not been connected yet poses a hazard. This applies especially to high-voltage applications (HV applications), in which voltages of more than 60 V are used.

In boats there is the need to disconnect individual components regularly from the wiring system or to connect additional components to the wiring system. A typical example is the outboard motor, which regularly needs to be disconnected from the hull for the change in the season or for servicing work. Personnel performing this work or the actual boat owner normally do not have the qualifications or training to handle HV components (high-voltage components) safely. Therefore the interfaces and plug-in connections with which the user comes into contact must be designed to be electrically isolated.

In addition, identical electrical boat drives are offered for different boats. The installed energy must then be adjusted to suit the boat characteristics and user behavior. This can be done by combining a plurality of battery modules containing a basic unit of energy into a larger battery bank. Since this adjustment is meant to be done by the boat builder or, if applicable, even by the boat owner, a safe plug-in connection must be used, which is electrically isolated at the contacts in practice.

In automobiles, the electrical drive system is often installed in a permanent installation, i.e. components such as a high-voltage battery (HV battery) and electric motor are connected together using screw-connections or preferably clamped connections.

Some of the components are connected also by means of male connectors, although the male connectors are not normally intended to be handled by the vehicle user but, if need be, by experts such as repair shops. Sometimes male connectors are also used in which the contacts are designed to protect against electric shock.

On boats, on the other hand, the components are connected to the wiring system or disconnected from the wiring system by laypeople. Moreover, the shock-proof design of the contacts can usually only be guaranteed in a dry environment, which often does not exist on boats.

Therefore the object of the present invention is to propose a boat having an electrical drive, and a corresponding method, in which electrical components can safely be connected to, or disconnected from, the wiring system of the boat.

This object is achieved by a boat having an electrical drive, which electrical drive comprises electrical components, in particular an electric motor and an electrical accumulator, that are connected to one another via an electrical wiring system, wherein at least one of the components is connected to the wiring system by means of a first connecting device, which has main contacts for connecting the at least one component to the wiring system, and wherein a second connecting device is provided in order to connect the electrical accumulator to the wiring system or to disconnect same from the wiring system, which boat is characterized in that the first connecting device comprises at least one auxiliary contact for connecting the at least one component to a monitoring line, and in that the monitoring line is operatively connected to the second connecting device.

The method according to the invention, for connecting an electrical component to an electrical wiring system comprising at least one electrical accumulator and located on a boat, is characterized in that the electrical accumulator is disconnected from the wiring system, the component is subsequently connected to the wiring system, and then the component is connected to a monitoring line, and the electrical accumulator is not connected to the wiring system until the component is connected to the monitoring line.

In addition, the object is achieved by a method for disconnecting an electrical component from an electrical wiring system comprising at least one electrical accumulator and located on a boat, which method is characterized in that initially the component is in the condition in which it is connected to the wiring system and to a monitoring line, then the component is disconnected from the monitoring line, whereupon the electrical accumulator is disconnected from the wiring system and then the component is disconnected from the wiring system.

According to the invention, at least one component is connected to the wiring system of the boat via a first connecting device. The component is connected to the wiring system via the main contacts. The first connecting device allows reversible disconnection and connection of the component to the wiring system without destroying the connecting device. The main contacts provide the supply of electricity and power to the component.

The first connecting device also comprises auxiliary contacts, which are not closed until the connection of the component to the wiring system has been definitely made via the main contacts. A signal which acts on a second connecting device is then transferred via the monitoring line. The second connecting device may be, for example, a relay, which draws the energy needed for switching from an auxiliary power supply. The second connecting device ensures that the electrical accumulator remains switched off, i.e. remains disconnected from the wiring system, for as long as the connection of the component to the monitoring line is still not made via the auxiliary contacts of the first connecting device. Only once the connection is made via the auxiliary contacts, and hence also the connection of the main contacts to the wiring system, is guaranteed, is the electrical accumulator connected to the wiring system. This ensures that the main contacts are electrically isolated when connecting the component.

The first connecting device is preferably in the form of a plug-in connection.

It is advantageous if the auxiliary contacts lag the main contacts. The term "lag" means that when the component is connected to the wiring system, the main contacts are closed first before the electrical connection is made via the auxiliary contacts. Similarly when disconnecting the component from the wiring system, the connection of the component to the monitoring line is broken first via the auxiliary contacts and then the connection of the component to the wiring system is disconnected via the main contacts.

The electrical accumulator is particularly a non-rechargeable or rechargeable battery. The invention provides particular safety benefits for electrical accumulators, in particular non-rechargeable or rechargeable batteries, that provide a voltage of more than 60 V, more than 100 V or more than 200 V. Thus the safety circuit according to the invention is used advantageously on boats, for example, that have a 300 V or 400 V power supply.

The monitoring line advantageously runs via a plurality of components and via the associated first connecting devices, which can be used to connect the components to the wiring system. Advantageously, all the first connecting devices are connected to the monitoring line via auxiliary contacts.

Advantageously, a plurality of components are connected to the monitoring line, which components are connected in parallel with one another in terms of the main contacts, but are connected in series with one another in terms of the auxiliary contacts.

In this case, a current can flow via the monitoring line and the connected components only when the auxiliary contacts of all the connected components are correctly closed. If the monitoring line is broken at any point because the auxiliary contacts of a component are not connected correctly to the monitoring line then no current flows in any of the components involved. All the components detect the break that exists and can respond appropriately.

If a system has an appropriate monitoring line, this can be used both for monitoring the connection of the connected component to the wiring system and for monitoring the component through other components. If the components are connected to the wiring system via plug-in connections, for example, in this embodiment the connected component has the facility to detect whether one of the plug-in connections of the other components is faulty or whether its own plug-in connection is faulty.

Advantageously the component itself, and not just its male connector, is also incorporated in the monitoring circuit, i.e. is connected to the monitoring line. In this case, in the event of a fault occurring in the connected component, the monitoring circuit is opened and the monitoring line is broken, with the result that the other components are informed of the system being in a faulty condition.

Hence in this embodiment, a plurality of components of the system have the property of being able to detect faults in other components and faults in the connections of the other components to the wiring system, and also of being able to signal faults that they themselves have.

The monitoring line can also be supplied from a voltage source, wherein the auxiliary contacts of a plurality of components are connected into the monitoring line in series.

In this case, all the components which are connected into the monitoring line up to the breakpoint detect a closed and hence fault-free monitoring circuit. This embodiment can bring advantages for certain applications and/or certain components.

In this form of the monitoring circuit, one of the components connects the voltage of the monitoring circuit through to the next component, or disconnects said voltage. If the next component receives this voltage, this component has the information that the components that come before in the monitoring circuit do not have a fault.

The auxiliary contacts of the components are connected in series in the monitoring line. A component here comes "before" another component in the monitoring circuit or in the monitoring line if the auxiliary contacts of said component are located closer to the non-ground potential of the voltage source than the auxiliary contacts of the other component. The other component accordingly comes "after" the first component.

If a fault occurs in a component, it will not switch through the voltage to the component that comes after. In this case, the component that comes after is informed that at least one of the components before it is faulty. The other components in the monitoring line that come before the faulty component do not register this fault, however. This embodiment of the invention is useful, for example, if in the event of a fault in an individual component, only selected other components, which are connected into the monitoring line downstream of the faulty component, are meant to be switched off.

In a preferred variant, this embodiment of the invention is implemented using a combination of relays and optocouplers having series resistors, wherein the optocoupler is energized by a current flowing from the monitoring line to ground via a series resistor. The monitoring signal, when there is no fault in the component and no fault in the connection of the main contacts of the component, is implemented by means of a relay, for which the voltage drop is negligible.

Electronic switches such as MOSFETs, for example, which have a very low internal resistance, can also be used instead of the relay.

In a further advantageous embodiment of the invention, the components or the component controllers thereof take their supply voltage from the monitoring line. Hence all the components or component controllers, including the faulty component/component controller, are connected to the supply voltage, but the components that come after are disconnected from the voltage supply and hence are safely de-energized.

The monitoring line can also be supplied from a current source. A current can flow via the monitoring line and the connected components, or to be precise via the auxiliary contacts of said components, only when the auxiliary contacts of all the connected components are correctly closed. If the line is broken at any point, there is no current flowing in any of the components involved, with the result that all the components can detect the break that exists and respond appropriately.

This principle can be applied, for example, using optocouplers, in which case per active component one transmitter and one receiver are connected in series. If the transmitter, for example a transmitting diode, which is part of the monitoring circuit, is energized, the component has the information that all the other monitored components and the male connectors thereof likewise do not have a fault.

If there is a fault in the component, the component will not energize the transmitting diode located on the component side, with the result that the monitoring line is broken and all the other components are informed of the existing fault.

In a preferred embodiment, the at least one component, which is connected, or is meant to be connected, to the wiring system via the first connecting device, comprises a component controller. In this case, the power is supplied to the component controller via the monitoring line. This has the advantage that the component remains completely electrically isolated until the connection via the main contacts is made and the connection via the auxiliary contacts is made.

The invention and further advantageous details of the invention are described below with reference to the schematic drawings by way of example.

DETAILED DESCRIPTION OF THE DRAWINGS

FIGS. 1 to 4 show different variants of the connection of one or more electrical components to the electrical high-voltage system on a boat. On a boat, components regularly need to be connected to the high-voltage system or disconnected therefrom. This work is often performed by people who are not electricians. The figures show circuits according to the invention which ensure that at the time that a component is connected or disconnected from the high-voltage system, the corresponding main contacts are electrically isolated and hence there are no risks to the boat crew.

Figure 1:
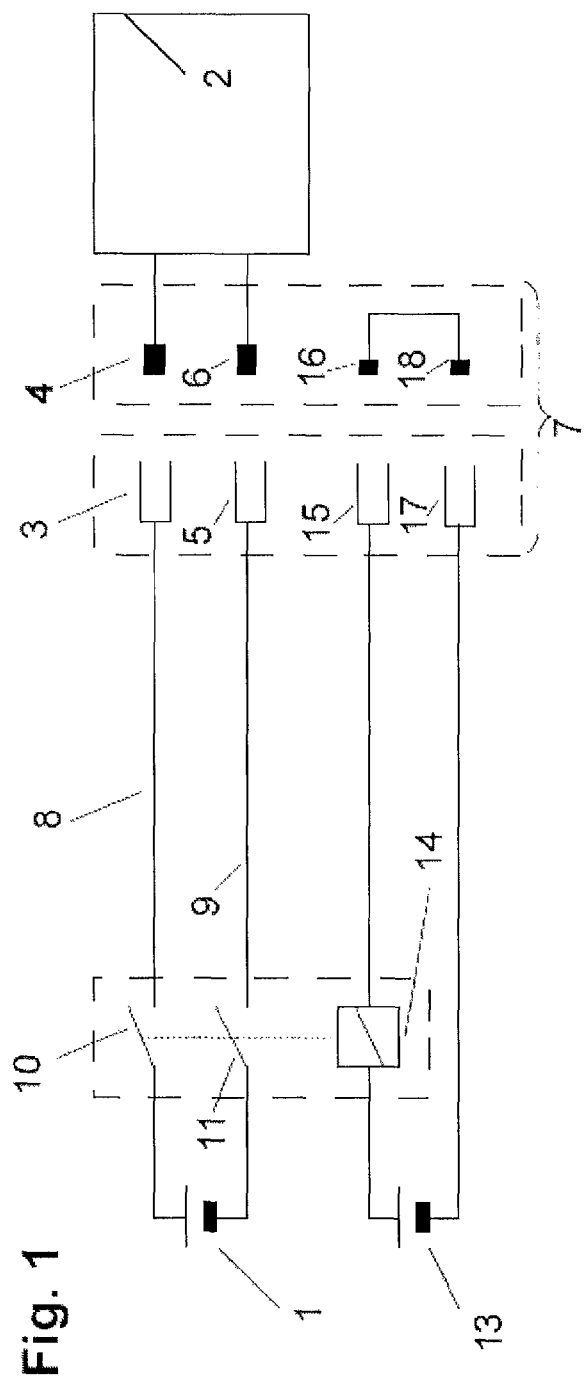
FIG. 1 shows a first embodiment of the circuit according to the invention.

FIG. 1 shows a high-voltage accumulator 1, in particular a high-voltage battery, to which a component 2 is meant to be connected. The high-voltage component 2, for example an electric motor, is connected by means of a first connecting device 7, which comprises main contacts 3, 4, 5, 6. The first connecting device is in the form of a plug-in connection comprising female connectors 3, 5, which are connected to the high-voltage accumulator 1 via lines 8, 9, and male connectors 4, 6, which are connected to the component 2.

In the lines 8, 9 between the high-voltage accumulator 1 and the female connectors 3, 5 are provided two connecting devices 10, 11, which are in the form of switches.

In addition, a monitoring circuit having a monitoring line 12 is provided, to which monitoring line an auxiliary voltage source 13 is connected. A relay 14, which is coupled to the switches 10, 11, is connected into the monitoring line 12. The switches 10, 11 are closed when a current is flowing via the monitoring line 12 and the relay 14. Conversely, the switches 10, 11 are open when no current is flowing via the monitoring line 12 and the relay 14.

The first connecting device also comprises auxiliary contacts 15, 16, 17, 18, which are likewise in the form of female connectors 15, 17 and male connectors 16, 18. On connecting the first connecting device 7, i.e. on closing the plug-in connection, the main contacts 3, 4, 5, 6 are closed first. The auxiliary contacts 15, 16, 17, 18 are mounted in the first connecting device 7 such that they are always closed after the main contacts 3, 4, 5, 6. The auxiliary contacts 15, 16, 17, 18 are not connected to one another until the main contacts 3, 4, 5, 6 are also connected correctly.

If the connection of the auxiliary contacts 15, 16, 17, 18 is definitely made, a current, which activates the relay 14 and acts on the second connecting device 10, 11, flows via the monitoring line 12. The second connecting device 10, 11 ensures that the electrical high-voltage accumulator 1 remains switched off, i.e. remains disconnected from the wiring system and the female connectors 3, 5, for as long as the connection of the component 2 to the monitoring line 12 is still not made via the auxiliary contacts 15, 16, 17, 18 of the first connecting device 7. Only once the connection is made via the auxiliary contacts 15, 16, 17, 18 and hence also the connection of the main contacts 3, 4, 5, 6 is guaranteed, is the electrical high-voltage accumulator 1 connected to the wiring system. This ensures that the main contacts 3, 4, 5, 6 are electrically isolated when connecting the component 2.

Figure 2:
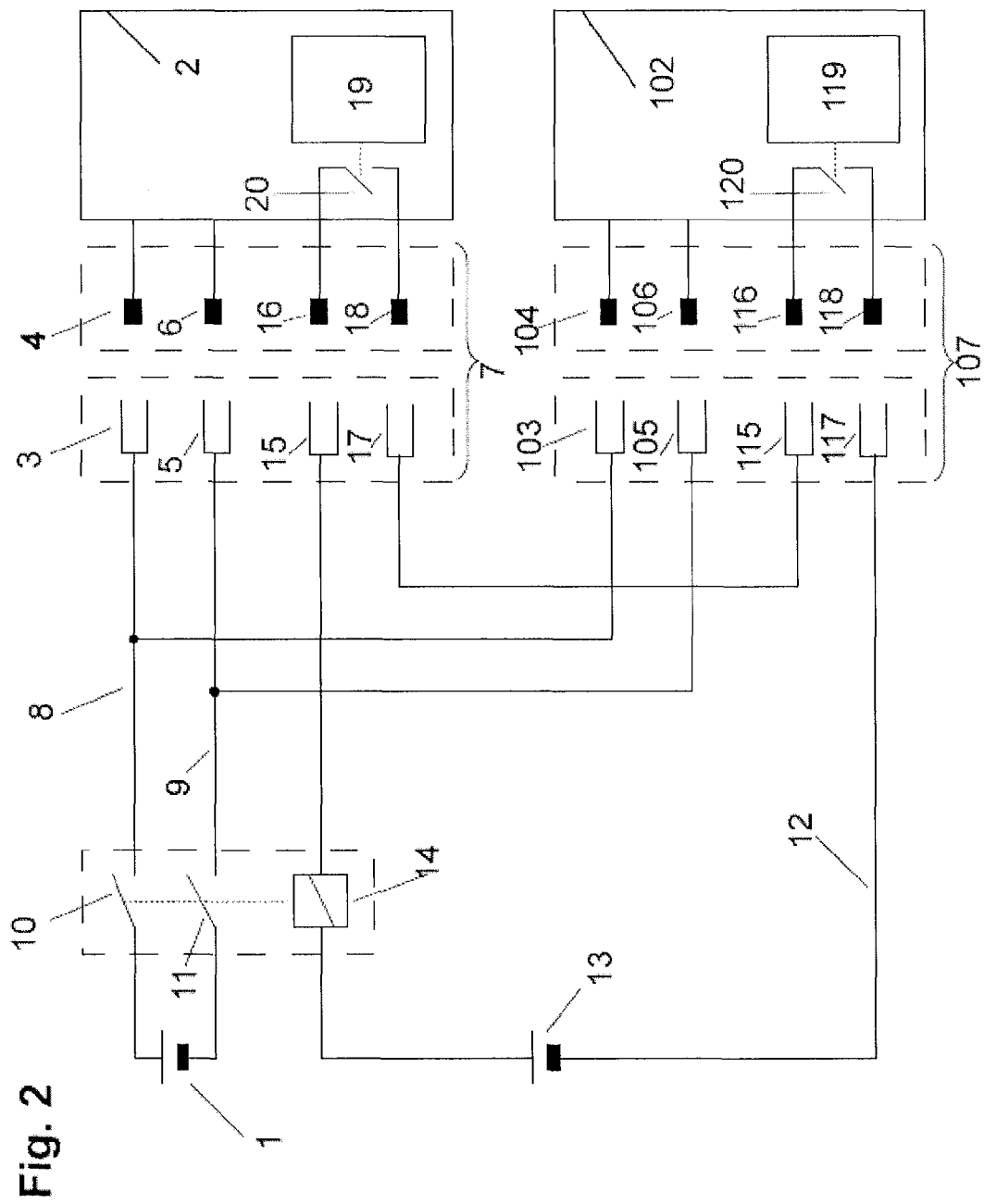
FIG. 2 shows a second embodiment of the circuit according to the invention.

FIG. 2 shows an embodiment of the invention in which the monitoring line not only monitors the correct closure of the first connecting device but also monitors the individual components themselves for faults.

In all the FIGS. 1 to 4, the same reference numbers are used to label identical parts.

FIG. 2 shows a variant in which in addition to the component 2, a further component 102 is connected, or is meant to be connected, to the high-voltage accumulator 1. The component 102 is similarly connected to the high-voltage accumulator 1 by means of a first connecting device 107 having main contacts 103, 104, 105, 106. The corresponding plug-in connection 107 comprises corresponding auxiliary contacts 115, 116, 117, 118, by means of which the component 102 can be connected to the monitoring line 12.

In the connected state, the components 2 and 102 are connected in series in terms of their main contacts. Respective intermediary switches 20, 120 connect the two male connectors 16, 18 to each other and the two male connectors 116, 118 to each other. If all the components 2, 102 are correctly connected via the main contacts 3, 4, 5, 6 and via the auxiliary contacts 15, 16, 17, 18, then the monitoring circuit is closed by the auxiliary voltage source 13, the relay 14, the plug-in connection 15, 16, the switch 20, the plug-in connection 17, 18 and the plug-in connection 115, 116, switch 120 and plug-in connection 117, 118.

The two components 2, 102 are equipped with respective fault detector units 19, 119, which check the components 2, 102 themselves for faults. When there is no fault, the corresponding switches 20, 120 and hence the monitoring circuit are closed. The relay 14 is thereby activated, which closes the switches 10, 11 and allows current to flow via the main contacts 3, 4, 5, 6, 103, 104, 105, 106.

The embodiment shown in FIG. 2 allows the plug-in connections 3, 4, 5, 6, 103, 104, 105, 106 of the connected components 2, 102 to be monitored and also the components 2, 102 to be monitored. In this type of application, for example, the connected component 2 has the facility to detect whether another component 102 is faulty or whether one of the male connectors 7, 107 is plugged in incorrectly. If a fault exists at one of these points, the monitoring circuit is not closed and the high-voltage accumulator 1 is isolated from the rest of the wiring system.

Figure 3:
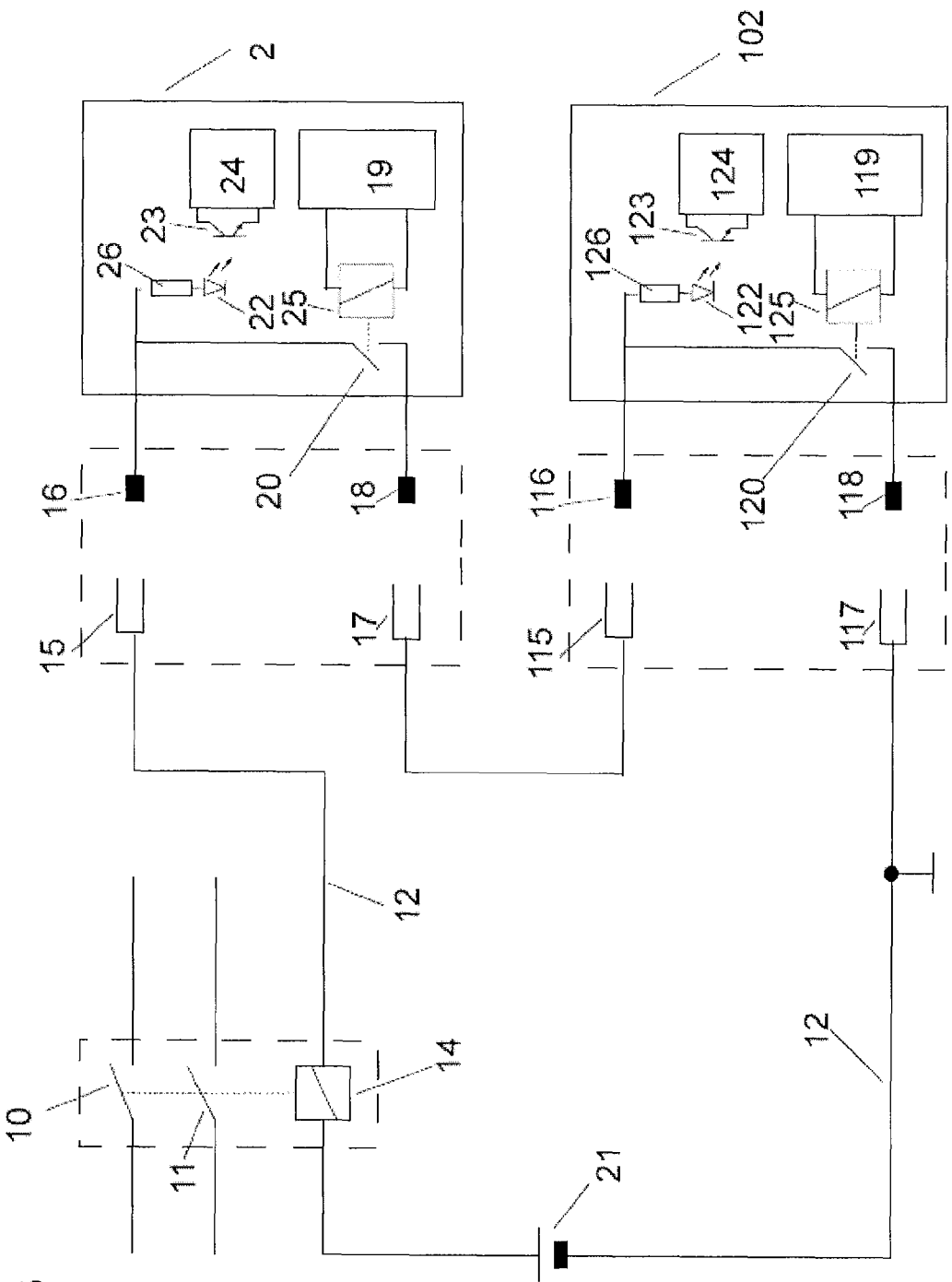
FIG. 3 shows a third embodiment of the circuit according to the invention.

FIG. 3 shows an embodiment in which the auxiliary voltage is provided by a voltage source 21. For the sake of clarity, FIG. 3 shows only the monitoring circuit without the high-voltage wiring system.

In this embodiment, for the case that the first connecting device 7 of the component 2 is connected correctly and the component 2 is working correctly, the voltage of the voltage source 21 is transferred to the auxiliary contact 115 of the connecting device 107 of the component 102. The voltage source 121 supplies to the auxiliary contact 15 a fixed voltage, which is applied to an optocoupler 22, 23 via the male connector 16 and a series resistor 26. The transmitter 22 of the optocoupler signals to the receiver 23 of the optocoupler that the connection has been made correctly. An evaluation unit 24 communicates this to the fault detection unit 19, which, provided the component 2 itself also has no fault, closes the switch 20 by means of a relay 25. The switch 20 and the optocoupler 22, 23 are connected in parallel with one another.

If there is no fault present when the component 2 is connected, the voltage from the voltage source 21 is applied to the female connector 115 and via male connector 116 to the optocoupler 122, 123. Monitoring that the component 102 has no fault and is connected correctly is performed in a similar manner.

In this form of the monitoring circuit, the component 2 connects the voltage of the monitoring circuit through to the next component 102, or in the event of a fault, disconnects said voltage. If this voltage is applied to the next component 102, the component 102 has the information that no fault has occurred in the component 2 that comes before in the monitoring circuit.

Similarly, the component 102 detects that another component located in the monitoring line 12 between itself and the voltage source has a fault if the voltage from the voltage source 21 is no longer applied to the female connector 115. Electronic switches such as MOSFETs, for example, which have a very low internal resistance, can also be used instead of the relay 25, 125.

Figure 4:
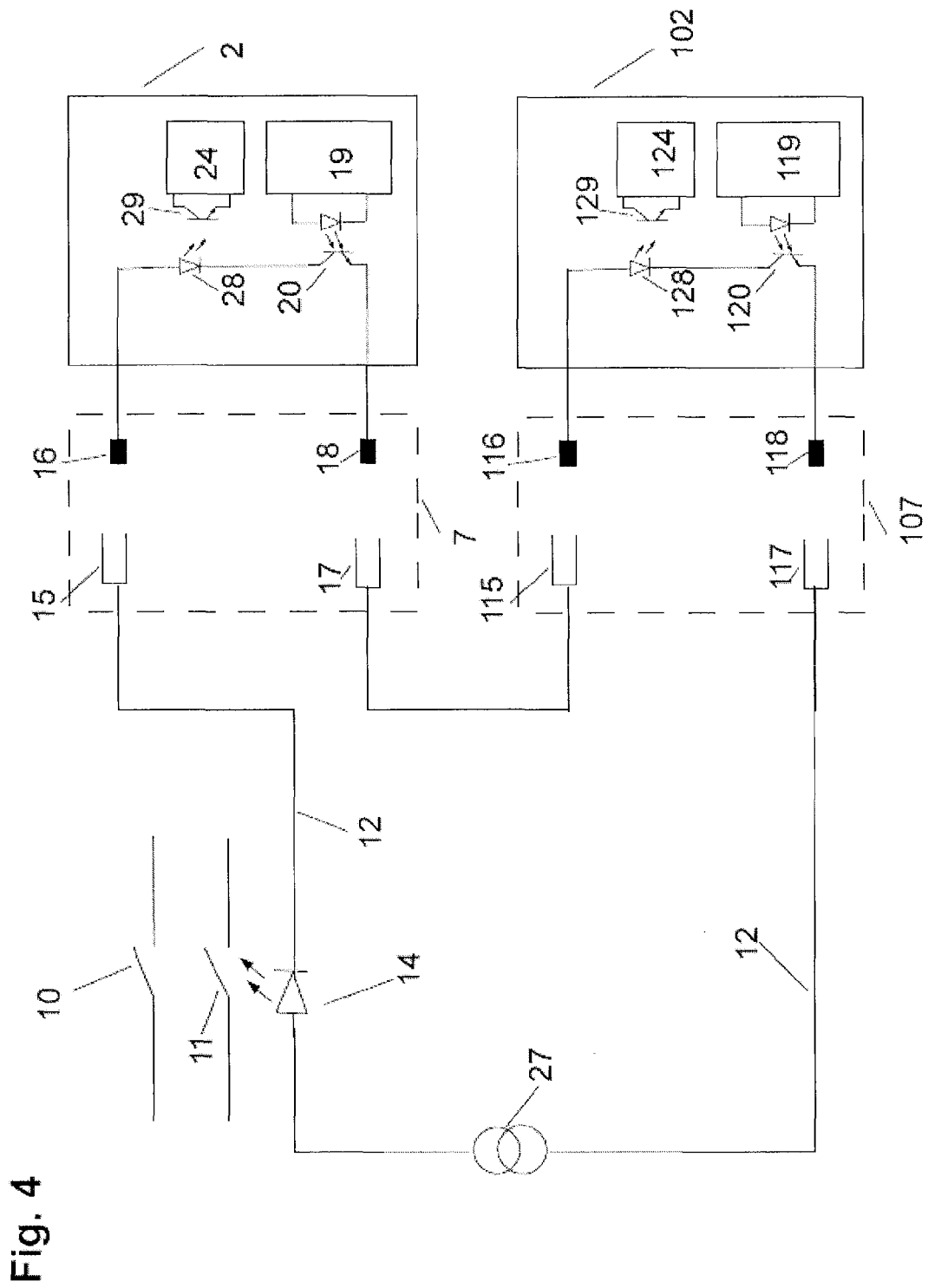
FIG. 4 shows a fourth embodiment of the circuit according to the invention.

Finally, FIG. 4 shows an embodiment having a current source 27 in the monitoring circuit. The high-voltage line circuit is only suggested, as in FIG. 3, for the sake of clarity.

Instead of the voltage source of FIG. 3, a current source 27 is now provided. A current can flow via the monitoring line 12, the first connecting devices 7, 107 and the connected components 2, 102 only when all the plug-in connections 15, 16, 17, 18, 115, 116, 117, 118 are closed and there are conducting connections between the male connectors 16 and 18 and between the male connectors 116 and 118. If the monitoring line 12 is broken at any point, no current flows in any of the components 2, 102 involved. This means that all the components 2, 102 detect a break.

In the circuit shown in FIG. 4, this is achieved by the optocouplers 28, 29 and 128, 129 being connected in series with switches 20 and 120 respectively. The switches 20, 120 are embodied as optically activatable switches in this variant. Optically activatable switches can likewise be used for the switches 20, 120 in FIGS. 2 and 3.

If the transmitting diode 28, 128 in the optocoupler is energized, that is to say a current is flowing through the transmitting diode 28, 128, this is an indication that all the components 2, 102 and their plug-in connections 7, 107 are working correctly. In this case, the monitoring circuit is closed and the switches 10, 11 of the high-voltage circuit are actuated and closed.

The invention claimed is:

1. A boat, comprising:
 an electrical drive having electrical components and an electrical accumulator, the electrical components being connected to one another via an electrical wiring system, wherein the electrical components comprise an electric motor;
 a first connecting device having main contacts connecting at least one of the electrical components to the wiring system; and
 a second connecting device connecting the electrical accumulator to the wiring system and configured to disconnect the electrical accumulator from the wiring system,
 wherein the first connecting device further includes auxiliary contacts connecting the at least one electrical component to a monitoring line operatively connected to the second connecting device.

2. The boat of claim 1, wherein the first connecting device is in the form of a plug-in connection.

3. The boat of claim 1, wherein the auxiliary contacts lag the main contacts.

4. The boat of claim 1, wherein the electrical accumulator is a battery.

5. The boat of claim 1, wherein the electrical accumulator is a voltage source having a terminal voltage of more than 60 V.

6. The boat of claim 1, wherein a plurality of the electrical components are connected to the monitoring line, and wherein the main contacts are connected in parallel with one another.

7. The boat of claim 1, wherein a plurality of the electrical components are connected to the monitoring line, and wherein the auxiliary contacts are connected in series with one another.

8. The boat of claim 1, wherein the electrical components comprises a component controller, and power is supplied to the component controller via the monitoring line.

9. The boat of claim 1, wherein a voltage source is connected to the monitoring line.

10. The boat of claim 1, wherein a current source is connected to the monitoring line.

11. The boat of claim 1, wherein the monitoring line is operatively connected to the second connecting device by means of a relay.

12. The boat of claim 1, wherein the electrical components comprise a fault detection unit connected to the monitoring line.

13. A sequential method for connecting an electrical component to an electrical wiring system, including at least one electrical accumulator, of a boat, the sequential method comprising:
 disconnecting the electrical accumulator from the wiring system;
 connecting the electrical component to the wiring system
 connecting the electrical component to a monitoring line; and
 connecting the electrical accumulator to the wiring system.

14. A sequential method for disconnecting an electrical component from an electrical wiring system, including at least one electrical accumulator, of a boat, wherein the electrical component is initially connected to the wiring system and to a monitoring line, the sequential method comprising:
 disconnecting the electrical component from the monitoring line;
 subsequently disconnecting the electrical accumulator from the wiring system; and
 disconnecting the electrical component from the wiring system.

* * * * *